United States Patent [19]

Geelhood et al.

[11] 4,350,890

[45] Sep. 21, 1982

[54] APPARATUS FOR MONITORING LOW LEVEL LIGHT EMISSION IN UNDERWATER ENVIRONMENT

[75] Inventors: Bruce D. Geelhood, La Mesa; Gary F. Mastny, San Diego; Jerry E. Solomon, San Diego; Edward J. Wesley, San Diego; Elek Lindner, San Diego; Carol A. Dooley, San Diego; Sandra M. Lane, San Diego, all of Calif.

[73] Assignee: The United States of America as represented by the Secretary of the Navy, Washington, D.C.

[21] Appl. No.: 215,596

[22] Filed: Dec. 12, 1980

[51] Int. Cl.³ .................... G01J 1/42; G01T 1/20; F01C 3/00
[52] U.S. Cl. ......................... 250/372; 250/361 C; 422/68
[58] Field of Search ............... 250/361 R, 361 C, 372, 250/373; 350/164; 106/15.05; 422/68; 354/64

[56] References Cited

U.S. PATENT DOCUMENTS 2,616,334 11/1952 Zernike .................. 350/164
4,139,515 2/1979 Dennington ............ 106/15.05
4,191,579 3/1980 Hails et al. .............. 106/15.05

Primary Examiner—Alfred E. Smith
Assistant Examiner—Janice A. Howell
Attorney, Agent, or Firm—Robert F. Beers; Ervin F. Johnston; James O. Skarsten

[57] ABSTRACT

A device for monitoring low levels of light emission in a selected underwater environment is provided with a photodetector having a light sensitive surface oriented into the environment, the photodetector generating electrical signals which are representative of light impinging upon the light sensitive surface. A window is positioned between the light sensitive surface and the underwater environment to protect the photodetector from the underwater environment, and a first material is positioned between the window and the underwater environment to prevent biological growth upon the window. A second material is placed in cooperative relationship with the first material to shift the wavelengths of certain light photons occurring in the underwater environment from a first wavelength range to a second wavelength range, in order to increase the attenuation lengths of the photons before they pass through the window.

14 Claims, 4 Drawing Figures

APPARATUS FOR MONITORING LOW LEVEL LIGHT EMISSION IN UNDERWATER ENVIRONMENT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein generally pertains to the field of apparatus and techniques for monitoring very low levels of light emission or radiation in an underwater environment. More particularly, the invention pertains to monitoring the emission of light in a natural body of water, such as a quantity of seawater, which is included in a particular range of wavelengths such as the ultraviolet range.

In monitoring broadband low level light radiation in an underwater environment, and particularly in a natural environment such as a body of seawater, light photons having wavelengths of less than 400 nm. have proven to be of great interest. Above 400 nm., bioluminescent light, i.e., light which is emitted by microorganisms present in an underwater environment, tends to be so dominant that it is impossible to determine whether light present in the environment has been generated by the organisms, or has been generated by some other broadband low level light source. Consequently, the present or absence of low level light sources other than bioluminescent organisms in a natural underwater environment may not be determined by monitoring light of a wavelength which is in excess of 400 nm.

In order to eliminate interferring effects of bioluminescent light in monitoring broadband low level light emission in an underwater environment, a selected optical filter may be employed with a photodetector. For example, if a photomultiplier tube is used for a detector, a filter may be interposed between the photo tube and the environment to prevent passage of any light of wavelength in excess of 400 nm. The filter therefore prevents most bioluminescent light from reaching the photodetector.

Visible light of less than 400 nm. wavelength is generally considered to be in the ultraviolet range or regime. It has been found that light in the 300–400 nm. range has an attenuation length of 5 meters in seawater, attenuation length being the distance that a light photon is likely to travel through a medium before being absorbed thereby. A 5 meter length is sufficient to enable significant numbers of ultraviolet light photons generated in proximity to a photodetector to pass through an optical filter and a protective window, or viewing port, at the photodetector before being absorbed. Photons of 300–400 nm. wavelength may therefore usefully be monitored, for example, to observe the activity of a low level light source.

A source of low intensity light emission may also generate light photons in the wavelength range 200–300 nm., and the detection of such photons may likewise be useful for monitoring the activity of a low level source. However, the attenuation length of photons of less than 300 nm. wavelength is less than 5 meters, and decreases rapidly down the range, so that the attenuation length of photons of 200 nm. wavelength is on the order of 1 centimeter. Consequently, very few photons in the 200–300 nm. wavelength range will be able to reach the photodetector, and pass through the optics thereof to be detected thereby. In addition, if monitoring activity requires a photodetector to remain in an underwater environment for an extended period of time, the window or viewing port of the detector must be coated with an antifouling material, to prevent biological growth thereupon. It has been found, for example, that after seven days, a viewing port placed in a body of natural seawater becomes so covered with biological growth that only 20% of the light can pass therethrough. However, substances commonly used to prevent biological fouling do not transmit light which is less than 300 nm. in wavelength.

The invention of Applicants overcomes the above problems by providing means for shifting light of 200–300 nm. wavelength into a wavelength range of 300–400 nm. Light in the 200–300 nm. range is thereby made detectable by a system which may be deployed in a natural underwater environment for a period of as long as three months, to monitor low levels of light occurring therein. By providing the capability to detect light in the 200–300 nm. range as well as in the 300–400 nm. range, substantial improvements in detection sensitivity may be realized.

SUMMARY OF THE INVENTION

In the present invention, apparatus is provided for monitoring low levels of light emission in a selected underwater environment. A photodetection means having a light sensitive surface oriented into the environment is provided for generating electrical signals which are representative of the amount of light impinging upon the light sensitive surface, and window means positioned between the light sensitive surface and the underwater environment to protect the photodetection means from the underwater environment. A first material is positioned between the window means and the underwater environment to prevent biological growth upon the window means, and a second material is placed in cooperative relationship with the first material to significantly increase the attenuation lengths of photons occurring in the underwater environment which have wavelengths included in a prespecified wavelength range.

Preferably, the photodetection means comprises means such as one or more photomultiplier tubes for detecting discrete photons of light, and the first material comprises a selected anti-foulant material for coating the window means to prevent biological growth thereupon. The second material comprises a selected waveshifting material for coating a surface to shift the wavelength of a photon impinging thereupon from a first wavelength range to a second wavelength range, the coated surface being positioned from the light sensitive surface of the photodetection means at a distance which is short in relation to the attenuating length of a photon in an underwater environment having a wavelength in the second wavelength range.

In a preferred embodiment of the invention, useful for detecting ultraviolet light activity in a natural body of water, the photodetection means is enclosed in a cylindrical chamber into which a quantity of water is drawn from the environment. The window means comprises a quartz window placed over the photodetection means to protect the photodetection means from water contained in the chamber, and an optical filter device is employed to prevent light of wavelengths which are in excess of 400 nm. from being detected by the photodetection means. Effects of bioluminescence in the underwater environment are thereby controlled or eliminated. The inner surface of the cylindrical chamber is formed of light scattering material (i.e. Teflon) coated with the waveshifting and antifoulent material which is comprised of p-terphenyl dissolved in toluene, mixed into the antifoulent which shifts ultraviolet light photons impinging thereupon from a wavelength range of 200–300 nm. into a wavelength range of 300–400 nm. while also protecting the optical scattering material from biological fouling.

OBJECTS OF THE INVENTION

An important object of the present invention is to provide an improved system for monitoring light emission activity of very low intensity in an underwater environment.

Another object is to monitor low levels of ultraviolet light emission in a natural underwater environment, such as a body of seawater.

Another object is to provide a spreadable combination anti-foulant and waveshifting material.

Another object is to significantly increase the sensitivity of a device which is employed to monitor low levels of ultraviolet light emission in an underwater environment.

Another object is to significantly increase the amount of ultraviolet light which may be detected in an underwater environment, when such light occurs at a very low level of intensity.

Other objects and many of the attendant advantages of this invention will be readily appreciated as the same becomes better understood by reference to the following detailed description when considered in connection with the accompanying drawings.

DETAILED DESCRIPTION OF THE PREFERRED EMBODIMENT

Figure 1:
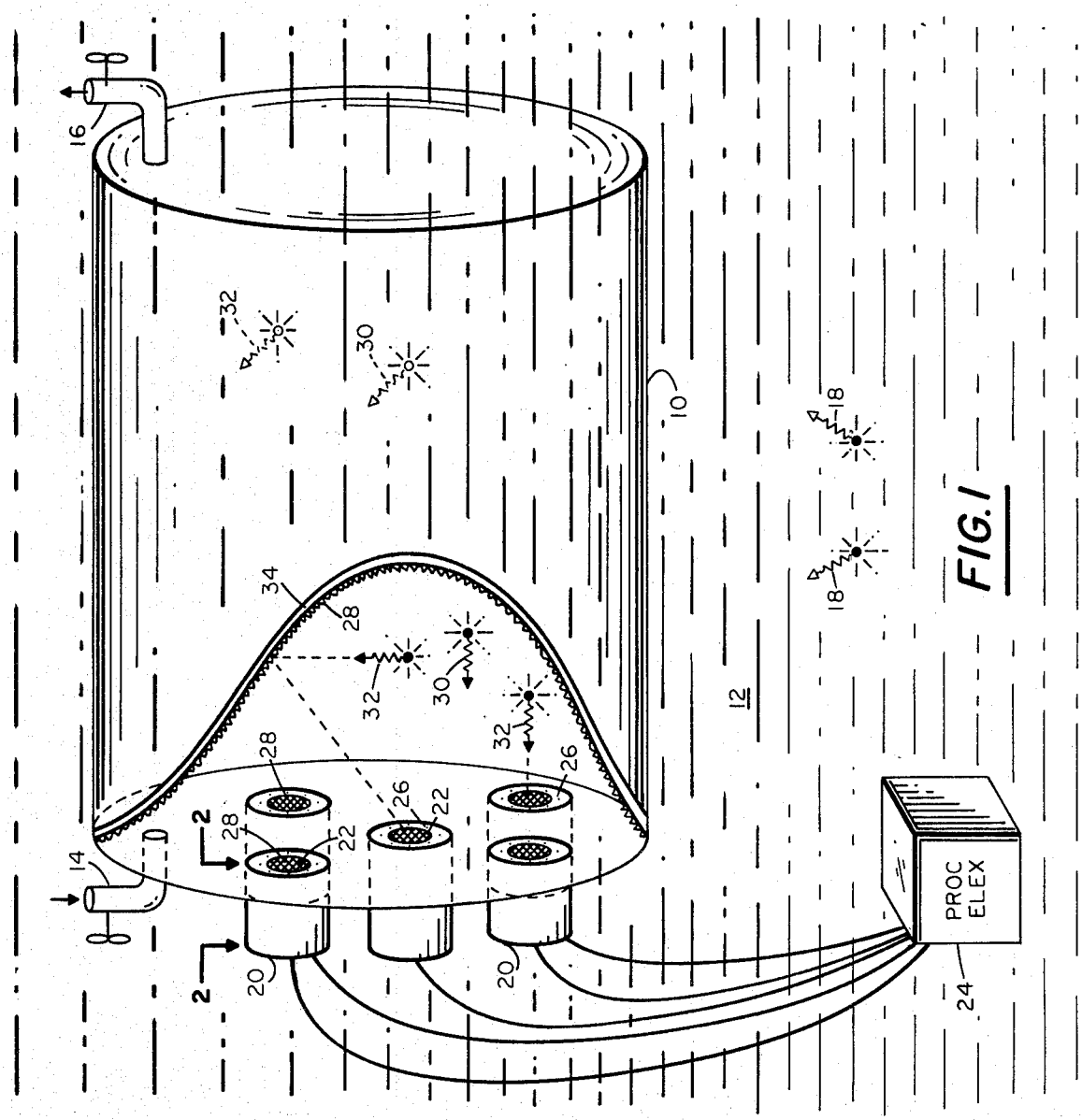
FIG. 1 is a perspective view showing an embodiment of the invention, a section being broken away therefrom.

Referring to FIG. 1, there is shown a cylindrical chamber 10 immersed in an underwater environment 12, such as a natural body of seawater. Intake and outflow systems 14 and 16, respectively, are provided to enable samples of water from environment 12 to be drawn into and expelled from the interior of cylindrical chamber 10, in controlled amounts and at a selected rate of flow. Consequently, if light emitting activity 18 is taking place in environment 12 in proximity to chamber 10, various characteristics of such activity may be determined by monitoring the light emission which is taking place within respective samples of water contained in chamber 10.

In order to detect light emission activity which is of very low intensity, a number of photodetector assemblies 20 are provided, each assembly 20 enclosing a device such as a photomultiplier tube. Each phototube includes a light sensitive surface, and generates electrical signals which represent discrete photons impinging upon its light sensitive surface. Photodetector assemblies 20 are positioned in an array at an end of chamber 10, and are oriented so that photons occurring in the interior of chamber 10 may travel toward and impinge upon the light sensitive surfaces enclosed in respective assemblies. Each photodetector assembly 20 includes a quartz pressure window 22, which protects the assembly from water and pressure of environment 12 while allowing light to pass from the interior of chamber 10 to the light sensitive surface of the assembly. Each assembly is coupled to a processing electronics package 24, which receives signals generated by respective phototubes, and each assembly is joined to chamber 10 by means of a retaining ring 26. Since the bioluminescent light which naturally occurs in an underwater environment 12 is likely to obscure other sources of low intensity light therein, as aforementioned, each assembly 20 includes an optical filter element for preventing light in excess of 400 nm., the bioluminescent range, from being detected.

FIG. 1 shows an array of five photomultipliers positioned at an end of cylindrical chamber 10. However, it is to be understood that the geometrical configuration of chamber 10, and the number and respective positions of photodetector assemblies 20 in relation thereto, may be selectively varied, according to the requirements of a particular application, without going beyond the scope of the present invention.

When the various surfaces enclosed within chamber 10 come into contact with the seawater of environment 12, biological growth commences thereupon. As aforementioned, within a two to three day period, windows 22 may become so covered with such growth that no light is able to penetrate therethrough to the light sensitive surfaces of respective photodetector assemblies. Therefore, in order to enable chamber 10 to be deployed for an extended time period in an environment in which frequent maintenance is impractical or impossible, each quartz window 22 is coated or overlaid with a material 28, which includes an anti-foulant material such as an organic tin polymer, in the form of a clear coating. Tin polymer coatings found to be suitable for the above purpose include a substance produced by the Navy and designated thereby as OMP-2, and a substance produced by M&T Corporation and designated thereby as CN9484.

If a photon 30, having a wavelength in the range 300–400 nm., is generated in the interior of chamber 10, the attenuation length thereof is 5 meters, as aforementioned. Such length is sufficient to enable large numbers of photons 30 generated in chamber 10 to penetrate the anti-foulant material of coating 28 upon an assembly, and also the respective optical elements thereof, without being absorbed. On the other hand, it is very difficult for a photon 32, having a wavelength in the range 200–300 nm., to reach the light sensitive surface of an assembly 20. Photons 32 are likely to be absorbed by the anti-foulant material or optical elements of the assembly such as its window or optical filter. However, photons 32 may comprise a very significant proportion of the light within chamber 10 which is less than 400 nm. wavelength, and which is therefore available for low level light detection activity. Consequently, coating material 28 also includes a waveshifting material having the property that photons of 200–300 nm. wavelength which are received thereby are shifted in wavelength into the 300–400 nm. range. Such waveshifting material is usefully formed by dissolving the substance p-terphenyl into toluene, in a closed cycle reflux apparatus. Such solution is mixed with one of the aforementioned antifoulant polymer paints, for example, in the concentration of 3 grams per liter of p-terphenyl. By overlaying windows 22 with the above mixture, photons 32 reaching the windows tend to be shifted in wavelength before being absorbed by the anti-foulant material, and are thereby enabled to reach the light sensitive surfaces of the photodetector assemblies.

In order to substantially increase the number of photons 32 in chamber 10 which get shifted into the 300–400 nm. range, the inner cylindrical wall 34 of chamber 10 comprises a light scattering material such as the material commercially marketed by Dupont under the trademark Teflon. Teflon surface 34 is coated or overlaid with material 28, so that light photons 32 impinging thereupon are shifted in wavelength to become photons 30, and are then scattered back into chamber 10. The anti-foulant material included in mixture 28 prevents biological growth upon the Teflon surface 34, so that the light scattering capability thereof is not diminished over time. It has been found that the above configuration of chamber 10, photodetector assemblies 20, and combination wave-shifting and anti-fouling material enables low levels of light activity in seawater to be monitored for periods on the order of several months.

Figure 2:
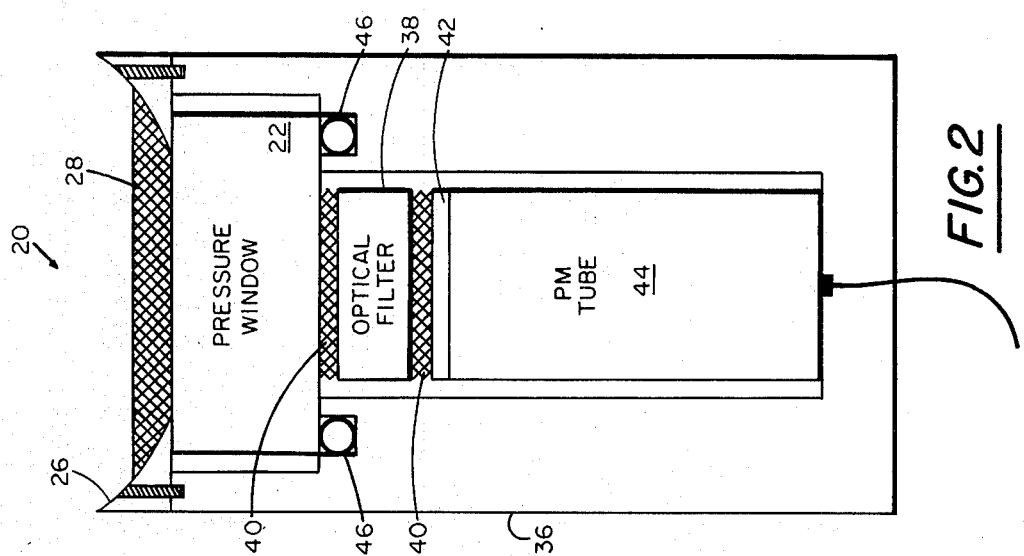
FIG. 2 is a cross-sectional view of a photodetector assembly of the embodiment of FIG. 1, taken along lines 2—2 of FIG. 1.

Referring to FIG. 2, there is shown a cross-sectional view of a photon detection assembly 20, the assembly including a housing 36 for enclosing the respective elements thereof. FIG. 2 shows the face of quartz window 22 which is exposed to environment 12 coated by mixture 28, as aforementioned, and further shows window 22 optically coupled to an optical filter 38 by means of a layer of optical coupling grease 40. Optical filter 38 comprises a device for preventing passage of light which is in excess of 400 nm. in wavelength, to eliminate the effects of bioluminescence as aforementioned, and usefully comprises a device known in the art as a Corning 7-54, or a Schott UG-11 optical filter. A second layer of optical coupling grease 40, which usefully comprises a substance known in the art as GE-G688, is emplaced between filter 38 and the light sensitive surface 42 of a photomultiplier tube 44. A photomultiplier tube is a device which generates electrical signals representing discrete photons which impinge upon its light sensitive surface, and usefully comprises a device manufactured by RCA, and designated thereby as the RCA-8575.

FIG. 2 further shows an O-ring 46, which is placed in an annular channel formed in housing 36. O-ring 46 is compressed by quartz window 22, when retaining ring 26 is tightened, to form a watertight seal between environment 12 and the cavity of housing 36 in which photomultiplier tube 44 is contained.

Figure 3:
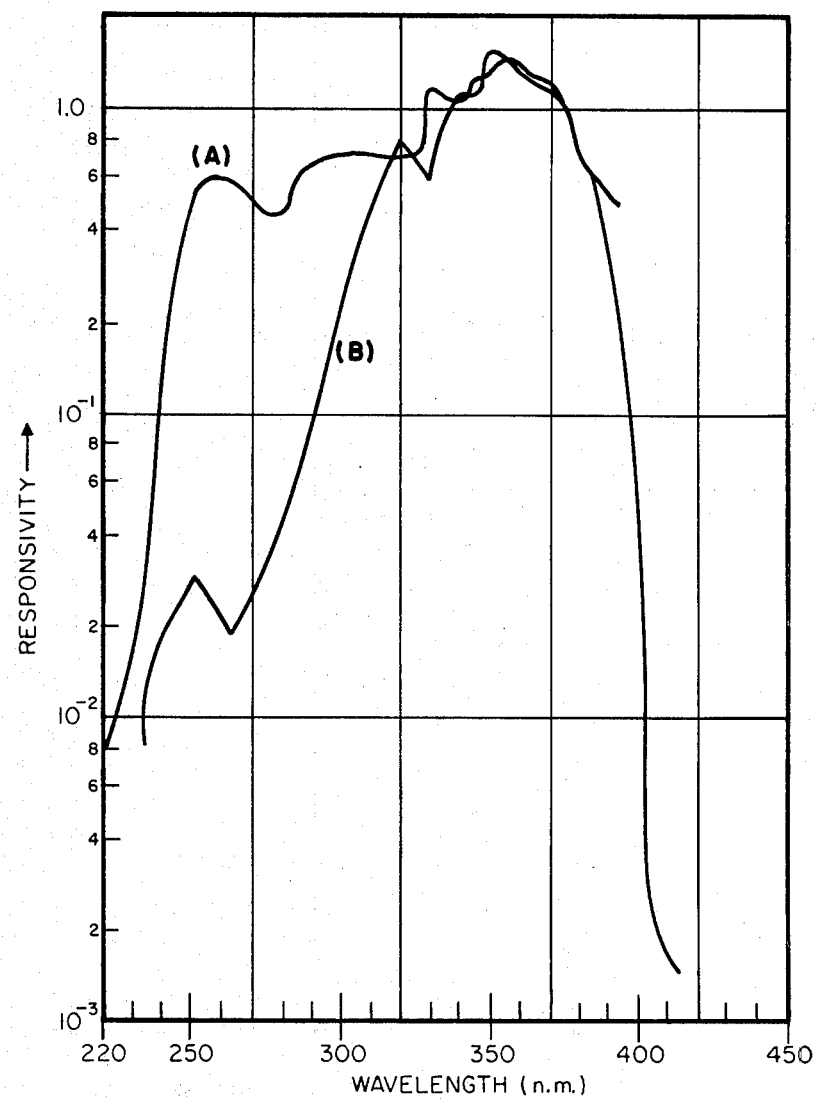
FIG. 3 is a set of curves for illustrating important advantages which the embodiment of FIG. 1 provides over the prior art.

Referring to FIG. 3, there is shown a curve (A), which indicates the responsivity of the photomultiplier tube 44 of a photodetector assembly 20 to photons of various wavelengths, when the window 22 of the assembly and the cylindrical inner wall of chamber 10 are coated with mixture 28, as described above. FIG. 3 also shows a curve (B), which indicates the responsivity of the photomultiplier when the window and the inner cylindrical wall are left uncoated and a sample of environment 12 is brought into chamber 12. It will be noted that above 300 nm., curves (A) and (B) substantially concur. On the other hand, in the wavelength range 200–300 nm., the responsivity of the photomultiplier is shown by FIG. 3 to be improved by many orders of magnitude by the employment of mixture 28. A substantial increase in the sensitivity in the monitoring or detecting of low intensity light emission may thereby be realized.

It is to be noted that curves (A) and (B) are compiled by data generated by processing electronics package 34 in response to signals received thereby from respective photomultipliers 44. While the structure of electronic package 34 may vary according to the intended application thereof, it is anticipated that one of skill in the art could readily provide a suitable electronics package for a particular application.

Figure 4:
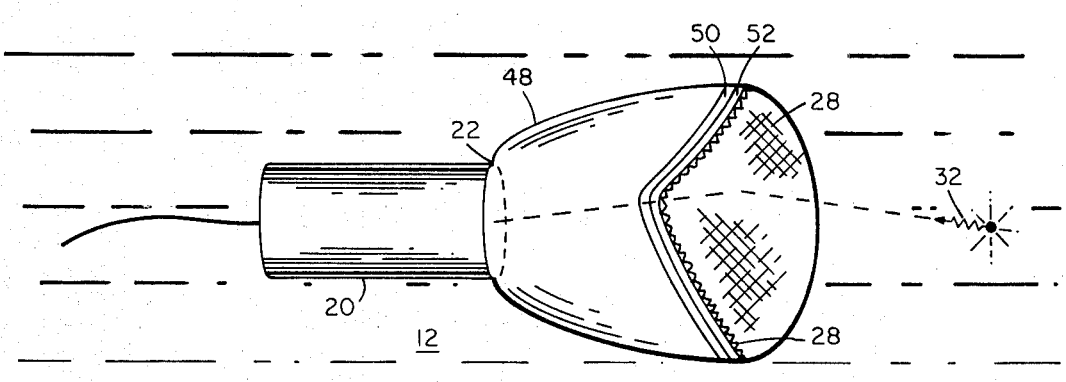
FIG. 4 is a perspective view showing a modification of the embodiment of FIG. 1, a section being broken away therefrom.

Referring to FIG. 4, there is shown a photodetector assembly 20 immersed in underwater environment 12 to monitor low level light activity therein. A device 48, known in the art as a Winston collector, is employed to direct photons which enter the collector toward window 22 of the assembly 20, and to pass therethrough to the photomultiplier tube of the assembly. The inner wall of the Winston collector 48 is coated with mixture 28 so that when photons 32 impinge against the inner wall thereof, they are waveshifted into the 300–400 nm. range, as aforementioned. The inner wall of collector 48 may comprise Teflon material, as aforementioned, or any other material which is capable of (1) reflecting light impinging thereupon (2) withstanding corrosive effects of seawater when exposed thereto over a period of time (3) and providing a surface to which mixture 28 is bondable.

It has been found that very few materials besides Teflon are available which have all of the above capabilities. As an alternative to using Teflon, collector 48 may have an inner wall 50, comprising a selected light reflective material, such as aluminum, an inner wall 50 being overlaid with a light transmissive material 52 which is capable of both withstanding seawater corrosion and providing a surface to which mixture 28 will adhere.

Obviously, many other modifications and variations of the present invention are possible in the light of the above teachings. It is therefore to be understood that within the scope of the appended claims the invention may be practiced otherwise than as specifically described.

What is claimed is:

1. Apparatus for monitoring low levels of light emission in a selected underwater environment, said apparatus comprising:
   photodetection means having a light sensitive surface oriented into said environment for generating electrical signals which are representative of light impinging upon said light sensitive surface;
   window means positioned between said light sensitive surface and said underwater environment for protecting said photodetection means from said underwater environment;
   a first material positioned between said window means and said underwater environment for preventing biological growth upon said window means; and a second material placed in cooperative relationship with said first material for significantly increasing the attenuation lengths of light photons occurring in said underwater environment which have wavelengths included in a prespecified wavelength range.

2. The apparatus of claim 1 wherein:
said first material comprises a selected anti-foulant material for coating said window means to prevent biological growth upon said window means; and
said second material comprises a wave shifting material for coating a selected surface to shift the wavelength of a photon impinging upon said coated selected surface from a first wavelength range to a second wavelength range, said coated selected surface being positioned from said light sensitive surface at a distance which is short in relation to the attenuation length of a photon in said environment which has a wavelength in said second wavelength range.

3. The apparatus of claim 2 wherein said environment contains bioluminescent organisms, and wherein:
said photodetection means comprises means for detecting very low levels of light emitting activity; and
said apparatus includes an optical filter means positioned between said window means and said photodetection means for preventing light in the wavelength range of light emitted by said organisms from reaching said light sensitive surface.

4. The apparatus of claim 3 wherein:
said photodetection means comprises means for detecting discrete photons emitted in said environment, said light sensitive surface of said photodetection means being separated from said optical filter means by a first layer of optical coupling grease, said optical filter means being separated from said window means by a second layer of optical coupling grease.

5. The apparatus of claim 4 wherein:
said first material and said second material are selectively mixed together to form a coating for said window means.

6. The apparatus of claim 2 wherein:
said apparatus includes a chamber means for enclosing both said photodetection means and a selected quantity of water, the inner surface of said chamber means comprising a light scattering surface; and
said waveshifting material comprises means for coating said light scattering surface.

7. The apparatus of claim 6 wherein:
said first and second materials are selectively mixed together to form a spreadable material for coating said light scattering surface.

8. The apparatus of claim 7 wherein:
said light scattering surface comprises a light reflective surface which is overlaid by a layer of light transmissive material to which said mixture of coating material is bondable.

9. Apparatus for optimizing the detection of ultraviolet light in a selected natural body of water, said apparatus comprising:
photodetection means having a light sensitive surface oriented into said environment for generating electrical signals in response to discrete ultraviolet light photons impinging upon said light sensitive surface;
window means positioned between said light sensitive surface and said underwater environment for protecting said photodetection means from said underwater environment; and
a selected mixture of a first material and a second material for coating a face of said window means which is exposed to said underwater environment, said first material comprising means for shifting ultraviolet light photons from a first wavelength range into a second wavelength range, and said second material comprising means for preventing biological growth upon said exposed face of said window means.

10. The apparatus of claim 9 wherein said underwater environment comprises a selected natural body of water, and wherein:
said apparatus includes a light scattering surface positioned in said underwater environment proximate to said photodetection means, said light scattering surface being coated with said mixture and being spaced at a distance from said light sensitive surface of said photodetection means which is short in comparison with the attenuation length of a photon having a wavelength in said second wavelength range.

11. The apparatus of claim 10 wherein:
said light scattering surface comprises a light reflective inner surface of a cylindrical chamber, a quantity of water being selectively brought into said chamber from said natural body of water;
said photodetection means comprises a selected number of photomultiplier devices oriented toward the interior of said chamber; and
said window means comprises a number of quartz windows equal to the number of photomultiplier tubes, each of said quartz windows being positioned between the light sensitive surface of a photomultiplier tube and the water contained in said chamber.

12. The apparatus of claim 11 wherein:
optical filters are positioned between said quartz windows and their corresponding photomultiplier tubes, each of said optical filters comprising means for preventing the passage of light having wavelengths which exceeds on the order of 400 nm.; and
said first material comprises means for shifting the wavelength of an ultraviolet light photon from a first wavelength range having limits on the order of 200–300 nm. into a second wavelength range having limits on the order of 300–400 nm.

13. The apparatus of claim 9 wherein:
said first material comprises a quantity of p-terphenyl dissolved in toluene; and
said second material comprises a selected tin polymer paint.

14. The apparatus of claim 10 wherein:
said light scattering surface comprises a collector device oriented to direct light photons toward said window means, the inner surface of said collector being coated with said selected mixture.

* * * * *